US007771556B2

(12) United States Patent
Fort et al.

(10) Patent No.: US 7,771,556 B2
(45) Date of Patent: Aug. 10, 2010

(54) APPARATUS AND PROCESS TO APPLY ADHESIVE DURING LABELING OPERATIONS

(75) Inventors: Wesley C. Fort, Cumming, GA (US); Eric Lingier, Straelen (DE); Leslie J. Varga, Cumming, GA (US)

(73) Assignee: Nordson Corporation, Westlake, OH (US)

( * ) Notice: Subject to any disclaimer, the term of this patent is extended or adjusted under 35 U.S.C. 154(b) by 633 days.

(21) Appl. No.: 11/426,074

(22) Filed: Jun. 23, 2006

(65) Prior Publication Data

US 2007/0029036 A1 Feb. 8, 2007

Related U.S. Application Data

(60) Provisional application No. 60/696,483, filed on Jul. 1, 2005, provisional application No. 60/739,052, filed on Nov. 22, 2005.

(51) Int. Cl.

| | |
|---|---|
| ***B29C 65/48*** | (2006.01) |
| ***B29C 65/52*** | (2006.01) |
| ***B32B 37/12*** | (2006.01) |
| ***B32B 38/04*** | (2006.01) |
| ***B32B 7/14*** | (2006.01) |
| ***B05D 5/10*** | (2006.01) |
| ***B05D 3/12*** | (2006.01) |

(52) U.S. Cl. ....................... 156/256; 156/291; 156/295; 427/207.1; 427/208.6; 427/256; 427/290

(58) Field of Classification Search ................. 156/155, 156/250, 256, 290, 291, 295; 427/207.1, 427/208.2, 208.4, 208.6, 256, 289, 290
See application file for complete search history.

(56) References Cited

U.S. PATENT DOCUMENTS

| | | | |
|---|---|---|---|
| 1,946,339 | A | 2/1934 | Vigers et al. |
| 2,414,873 | A | 1/1947 | Herbst |
| 2,697,446 | A | 12/1954 | Harrington |

(Continued)

FOREIGN PATENT DOCUMENTS

| | | | |
|---|---|---|---|
| CH | 359086 | A | 12/1961 |

(Continued)

OTHER PUBLICATIONS

European Patent Office, European Search Report from Corresponding EP Application No. 05026304.5, Nov. 17, 2006.

(Continued)

*Primary Examiner*—Philip C Tucker
*Assistant Examiner*—Sing P Chan
(74) *Attorney, Agent, or Firm*—Wood, Herron & Evans, LLP

(57) ABSTRACT

A labeling apparatus and method for applying individual labels onto individual objects moving along a conveyor includes a label delivery mechanism configured to hold a plurality of the labels and operable to deliver individual ones of the labels adjacent to the conveyor. A non-contact adhesive spray applicator including at least one nozzle having a plurality of individual adhesive discharge orifices may be positioned and arranged to discharge adhesive from the orifices onto either the labels or the objects such that the labels may be respectively adhered to the objects.

34 Claims, 13 Drawing Sheets

U.S. PATENT DOCUMENTS

| | | | | |
|---|---|---|---|---|
| 2,957,489 | A | | 10/1960 | Fisher |
| 3,126,574 | A | | 3/1964 | Fox |
| 3,315,899 | A | * | 4/1967 | Quarve ....................... 239/586 |
| 3,327,680 | A | | 6/1967 | Talbot |
| 3,570,725 | A | | 3/1971 | Baker et al. |
| 3,788,561 | A | | 1/1974 | Vilagi et al. |
| 3,840,158 | A | | 10/1974 | Baker et al. |
| 3,849,241 | A | | 11/1974 | Butiri et al. |
| 3,851,146 | A | | 11/1974 | Bennett |
| 3,942,687 | A | | 3/1976 | Walus et al. |
| 4,020,194 | A | | 4/1977 | McIntyre et al. |
| 4,108,705 | A | | 8/1978 | Hadl et al. |
| 4,220,114 | A | | 9/1980 | Radowicz |
| 4,324,816 | A | | 4/1982 | Landis et al. |
| 4,386,998 | A | | 6/1983 | McIntyre et al. |
| 4,443,285 | A | * | 4/1984 | Roth et al. .................. 156/215 |
| 4,516,702 | A | | 5/1985 | Schmidt |
| 4,534,388 | A | | 8/1985 | Pall et al. |
| 4,544,431 | A | | 10/1985 | King |
| 4,550,681 | A | | 11/1985 | Zimmer et al. |
| 4,572,435 | A | | 2/1986 | Thompson |
| 4,675,208 | A | | 6/1987 | Kageyama et al. |
| 4,687,137 | A | | 8/1987 | Boger et al. |
| 4,735,169 | A | | 4/1988 | Cawston et al. |
| 4,774,109 | A | | 9/1988 | Hadzimihalis et al. |
| 4,798,163 | A | | 1/1989 | Claassen |
| 4,844,760 | A | | 7/1989 | Dickey |
| 4,962,871 | A | | 10/1990 | Reeves |
| RE33,481 | E | | 12/1990 | Ziecker et al. |
| 4,995,333 | A | * | 2/1991 | Keller et al. ................ 118/300 |
| 5,024,709 | A | | 6/1991 | Faulkner, III et al. |
| 5,027,976 | A | | 7/1991 | Scholl et al. |
| 5,078,168 | A | | 1/1992 | Konieczynski |
| 5,162,121 | A | | 11/1992 | Kawaguchi et al. |
| 5,335,825 | A | | 8/1994 | Fort |
| 5,336,320 | A | | 8/1994 | Hogan et al. |
| 5,342,647 | A | | 8/1994 | Heindel et al. |
| 5,407,101 | A | | 4/1995 | Hubbard |
| 5,423,889 | A | | 6/1995 | Colquitt et al. |
| 5,464,495 | A | * | 11/1995 | Eder .......................... 156/456 |
| 5,495,963 | A | | 3/1996 | Miller et al. |
| 5,535,919 | A | | 7/1996 | Ganzer et al. |
| 5,733,597 | A | | 3/1998 | Schmitkons et al. |
| 5,747,102 | A | | 5/1998 | Smith et al. |
| 5,753,350 | A | | 5/1998 | Bright |
| 5,772,106 | A | | 6/1998 | Ayers et al. |
| 5,791,531 | A | * | 8/1998 | Hassler, Jr. .................. 222/504 |
| 5,934,520 | A | | 8/1999 | Byerly et al. |
| 5,964,974 | A | | 10/1999 | Hinton |
| 6,036,106 | A | | 3/2000 | Peet |
| 6,056,155 | A | | 5/2000 | Byerly et al. |
| 6,089,413 | A | | 7/2000 | Riney et al. |
| 6,164,568 | A | | 12/2000 | Muller et al. |
| 6,253,957 | B1 | | 7/2001 | Messerly et al. |
| 6,257,445 | B1 | | 7/2001 | Means et al. |
| 6,279,603 | B1 | | 8/2001 | Czarnik et al. |
| 6,296,463 | B1 | | 10/2001 | Allen |
| 6,422,428 | B1 | | 7/2002 | Allen et al. |
| 6,431,241 | B1 | | 8/2002 | Gonzalo |
| 6,464,785 | B1 | | 10/2002 | Puffe |
| 6,499,631 | B2 | | 12/2002 | Zook |
| 6,669,057 | B2 | | 12/2003 | Saidman et al. |
| 6,688,580 | B2 | | 2/2004 | Jackson et al. |
| 6,730,396 | B2 | * | 5/2004 | Maloney ..................... 428/343 |
| 6,746,712 | B2 | * | 6/2004 | Hoffmann et al. ........ 427/208.6 |
| 6,852,366 | B2 | | 2/2005 | Zschaeck |
| 6,866,209 | B2 | | 3/2005 | Puffe |
| 2002/0014201 | A1 | | 2/2002 | Holmstrom |
| 2004/0217202 | A1 | | 11/2004 | Hynes |
| 2005/0268845 | A1 | | 12/2005 | Ganzer et al. |
| 2005/0271806 | A1 | | 12/2005 | Ganzer et al. |

FOREIGN PATENT DOCUMENTS

| | | | |
|---|---|---|---|
| DE | 19706317 | A1 | 9/1998 |
| DE | 10010952 | A1 | 9/2001 |
| FR | 2205831 | | 5/1974 |
| GB | 2170178 | A | 7/1986 |
| GB | 2182269 | A | 5/1987 |
| WO | 98/19916 | A1 | 5/1998 |
| WO | 03026893 | A | 4/2003 |

OTHER PUBLICATIONS

European Patent Office, International Search Report and Written Opinion from corresponding PCT Application No. PCT/US2006/024899, Dec. 1, 2006.

Nordson Corporation, Amherst, Ohio 44001, Nordson Drawing No. 803070, May 16, 1980.

European Patent Office, European Search Report in EP Application No. 05025150, Mar. 21, 2006.

Nordson Corporation, Nordson Drawing No. 803083, May 19, 1980.

Slautterback Corporation, Multiline Extrusion Applicators ML 400 Series, Technical Bulletin TB033, revised Jul. 20, 1990.

Slautterback Corporation, Multiline Extrusion Applicators ML 400 Series, Technical Bulletin TB033, revised Mar. 1, 1990.

Nordson Corporation, The Melting Pot, New Multi-Orifice Nozzle, Internal Publication of Nordson Corporation, vol. 2, Issue 1, Jan. 1981.

Acumeter Laboratories Incorporated, Wide Band Extrusion Nozzles, May 1983.

Nordson Corporation, Multi-Line Nozzle, a page from Technical Bulletin, p. 30, Oct. 1986.

Nordson Corporation, Series 700 Electric Guns, Brochure, 1996.

Nordson Corporation, Series E-350 Electric Guns, Brochure, 1997.

Nordson Corporation, Speed-Coat™ Siot Applicator, Brochure, 2003.

Barry-Wehmiller, Model 4500 Trine Roll-Fed Labeling System, undated, 2 pgs.

Barry-Wehmiller, Model 6700 Trine Roll-Fed Labeling System, undated, 2 pgs.

Krones, Krones Canmatic, Wrap-around labelling, undated, 7 pgs.

B&H Labeling Systems, Marathon XL Roll-Fed Labeler, undated, 1 pg.

Trine Labeling Systems, The Quick Change™ 4400, 2003, 1 pg.

* cited by examiner

APPARATUS AND PROCESS TO APPLY ADHESIVE DURING LABELING OPERATIONS

CROSS REFERENCES

This application claims the benefit of U.S. Provisional Patent Application Ser. Nos. 60/696,483 and 60/739,052, respectively filed on Jul. 1, 2005 and Nov. 22, 2005. The full disclosures of U.S. Provisional Patent Application Ser. Nos. 60/696,483 and 60/739,052 are expressly incorporated by reference herein.

TECHNICAL FIELD

The present invention generally relates to the application of labels onto objects, such as containers or other products or product packaging.

BACKGROUND

Labels may be in any number of sizes or shapes, but may generally fall into two categories. One category is the wrap-around label in which the leading edge of the label is initially tacked with adhesive to a three dimensional object, such as a container or other product or product packaging of any shape. The label is then wrapped around the object so that the trailing edge of the label overlaps and is adhesively secured to the label itself. The other category encompasses label applications in which both the leading and trailing edges of the label are affixed directly to the object.

In general, adhesive has been applied to the labels via a wheel coater. Wheel coaters contain an open reservoir for holding the adhesive. A rotating wheel receives a coating of adhesive, which in turn is transferred to the label in a contact operation. Typically, a container, such as a bottle, can or other type of container or object moves along a conveyor and a paper or plastic label is secured to the outer surface of the container or object during a high speed production operation. For example, many production lines run at between 250 and 1400 label applying operations per minute.

There remain several challenges associated with using wheel coaters to apply adhesive to labels or three-dimensional objects such as containers. For example, wheel coaters can limit line speed increases because the reservoir of adhesive is subject to contamination from outside sources as well as from char and curing. Additionally, small changes in the contour of the container or object may result in improper coating of the label, resulting in unacceptable adhesion or appearance. Wheel coaters are therefore not particularly suited for applying adhesive to containers or bottles having grooves and ridges. Wheel coaters are often high maintenance components, requiring substantial down time and cost. Because wheel coaters rely on contacting the substrate to transfer the adhesive, precise alignment of the wheel is required. As the surface of the vacuum wheel carrying the labels wears or any of the associated components become misaligned, the efficiency of the labeling operation is negatively impacted. Sometimes frequent component maintenance or adjustment may be required as a result. Finally, the amount of adhesive applied by wheel coaters cannot be easily or accurately adjusted over a wide operating range. This type of adjustment capability can be important, for example, to ensure consistent adhesive coating weight application even as production line speeds change.

Labeling apparatus may come in several different forms, however, two different forms are known as cut and stacked labeling apparatus and roll-fed labeling apparatus. The latter type may also be referred to as reel-fed apparatus. In each of these cases, adhesive is either applied to the label or to the object or container, or both. The label is picked off of a label delivery mechanism, such as a magazine feeder of cut and stacked labels, or a vacuum wheel which takes labels from a reel or roll and holds the label to the vacuum wheel with negative pressure. The labels in a roll-fed apparatus may be cut apart from one another before applied to the vacuum wheel or while on the vacuum wheel. Wheel coaters have been traditionally used for both cut and stack and roll-fed labeling operation. Further information on reel-fed labeling can be found in the "Krones Contiroll Reel-Fed Labeling," by Krones A G, dated July 2003, the disclosure is expressly incorporated by reference herein in its entirety. In addition, further information on wrap-around labeling can be found in "Krones Canmatic Wrap-Around Labeling," by Krones A G, dated Jun. 2001.

The securement of the label to a bottle or container, for example, must be of such a quality that the label can withstand the various conditions that may be later experienced by the container or bottle during its shipping, storage, and use subsequent to the product packaging or filling operation. For example, with bottles of carbonated beverages, the label must withstand the expansion of the bottle due to the carbonation of the beverage and, for example, additional expansion and contraction during shipping and storage operations in which the temperatures of the product may widely vary. Furthermore, and just as important, the label must also be aesthetically pleasing. This means that the exposed edge of the label should not readily dog ear, become detached, have exposed adhesive or large amounts of adhesive forming lumps underneath the label.

There is a need for a manner of applying adhesive to either labels or containers, or both, in which the adhesive may be applied in a non-contact fashion, but also with lower needs for maintenance, and good adhesive coverage, while at the same time using a minimum amount of adhesive necessary to produce a strong attachment of the label to the container. In addition, there is a need for increased control over the amount of adhesive that is applied. There is also the need to reduce or eliminate frequent adjustments to the dispensing system as is necessary in wheel systems, as well as the ability to provide precision which is not possible with wheel coater systems. There is also the need to increase throughput in order to attach labels at faster speeds and to provide systems and methods that allow adjustment of adhesive coating weights over wide ranges.

SUMMARY OF THE INVENTION

Generally, the invention provides labeling apparatus for applying individual labels onto individual three-dimensional objects moving along a conveyor. The apparatus includes a label delivery mechanism configured to hold a plurality of labels and operable to deliver individual ones of the labels adjacent to the conveyor. The invention also provides for a non-contact adhesive applicator including at least one nozzle. In one aspect of the invention, the nozzle may include a plurality of individual adhesive discharge orifices. The nozzle is positioned and arranged to discharge adhesive from the orifices onto either the labels or the object such that the labels may be respectively adhered to the objects. The three dimensional objects may, for example, comprise containers such as bottles, or other products or product packaging.

The label delivery mechanism may be of various types, such as roll or reel fed labeling mechanisms or magazine fed labeling mechanisms and various so-called in-line labeling machines. The adhesive spray applicator may be of various designs, however, one advantageous design has a cycle time of less than about 9 milliseconds and has a mechanism that draws residual amounts of the adhesive back into the discharge orifices upon shut off of the applicator. The adhesive may be discharged in various patterns, including in the form of filaments that form patterns that widen as the filaments move away from the orifices. This type of pattern may be referred to generally as a back and forth pattern, such as a swirling pattern, sinusoidal type pattern, omega-shaped pattern, zigzag pattern, etc. The spray applicator may include a plurality of the nozzles, depending on the dimension of the label to be adhered. The plurality of orifices of each nozzle and of adjacent nozzles attached to the same applicator may be linearly aligned and configured to discharge filaments of adhesive to form a column of closely spaced adhesive filament patterns.

In another aspect, the invention generally provides a labeling apparatus for applying individual labels onto individual objects moving along a conveyor. The labels each have a leading edge portion and a trailing edge portion and the objects each have a portion corresponding to the leading edge portion of the labels. The apparatus generally includes a label delivery mechanism configured to hold a plurality of the labels and operable to deliver individual ones of the labels adjacent to the conveyor. A non-contact adhesive applicator includes at least one nozzle having a plurality of individual adhesive discharge orifices. The nozzle is positioned and arranged to discharge adhesive from the orifices onto either the leading edge portion of each label or the portion of the objects corresponding to the leading edge portion of each label. A contact adhesive applicator is positioned and arranged to discharge adhesive onto the trailing edge portion of each label so that the labels may be respectively adhered to the objects. The contact adhesive applicator, for example, may be a slot gun.

In another aspect, a nozzle is provided for use in non-contact application of adhesive to a substrate. The nozzle includes a nozzle body and a first plurality of adhesive dispensing orifices arranged in a first row in the nozzle body. A first plurality of process air discharge orifices is associated with each of the first plurality of adhesive dispensing orifices and is configured to cause discharged process air to move adhesive filaments discharged from the first plurality of adhesive dispensing orifices in a generally back and forth pattern. A second plurality of adhesive dispensing orifices is arranged in a second row alongside the first row in the nozzle body. A second plurality of process air discharge orifices is associated with each of the second plurality of adhesive dispensing orifices. The second plurality of process air discharge orifices is configured to cause discharged process air to move adhesive filaments discharged from the second plurality of adhesive dispensing orifices in a generally back and forth pattern.

One method in accordance with the inventive concepts involves applying adhesive to labels, including: dispensing adhesive from a plurality of orifices spaced from a first label, and contacting the adhesive with the label at a plurality of spaced apart locations, with each location being spaced from a first edge of the first label to form a pattern of adhesive such that a space between the pattern of adhesive and the first edge of the first label is void of adhesive.

Another method of adhering individual labels to individual three-dimensional objects in accordance with the invention can comprise moving the individual objects along a conveyor, positioning the labels adjacent the conveyor, intermittently spraying adhesive from a plurality of orifices in a nozzle of a non-contact adhesive applicator onto either the labels or the objects, and adhering the individual labels respectively onto the individual objects. The above apparatus and methods involving the use of non-contact adhesive applicators may be used in various combinations and with contact applicators, such as slot guns.

Various additional advantages, objectives and features of the invention will become apparent to those of ordinary skill upon review of the following detailed description of the illustrative embodiments taken in conjunction with the accompanying drawings.

DETAILED DESCRIPTION OF THE ILLUSTRATIVE EMBODIMENTS

Figure 1:
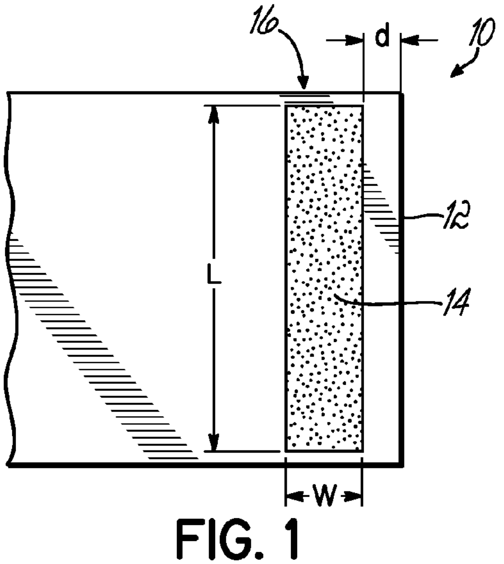
FIG. 1 is a partial fragmented view of a label.

FIGS. 1-4 generally show some examples of adhesive patterns that may be applied to a label 10 in a non-contact manner according to various aspects of the invention and, for example, with apparatus to be further described below. Below, the labels 10 are described in connection with methods and apparatus for application to containers, however, it will be appreciated that the labels may be applied to any desired objects. Multiple labels 10 may be referred to herein as label stock. For example, as shown in FIG. 1, adhesive applied in a non-contact manner is preferably spaced a distance "d" from an edge 12 of the label 10. The distance "d" may be chosen, for example, so as to preclude the adhesive from squeezing out and being exposed when the label 10 is applied to a container. Additionally, adhesive is preferably applied within an overall adhesive pattern area 14 that approximates the edge region 16 of the label 10. Thus, for labels having a rectangular appearance, or at least approximating a rectangle in the edge region 16, the pattern area 14 may also be a rectangle having a length "L" and a width "W". The adhesive may be applied to provide continuous coverage over the area 14 or may be applied to include a pattern. The area 14 is defined by the outer boundaries of each applied adhesive filament along the length "L" and width "W" of the pattern area 14. Various adhesive patterns may be applied, including beads, dots, filaments, or a combination thereof, or any other adhesive pattern. It is preferred that the adhesive be fairly evenly distributed to eliminate peaks or valleys that are readily visible to or readily felt by the consumer after the label 10 has been applied to the container.

Figure 2A:
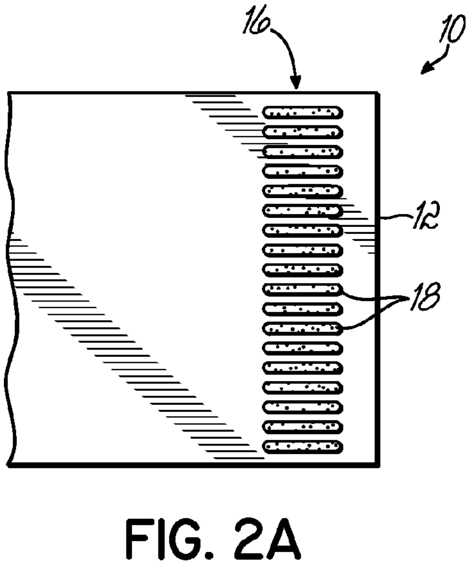
FIGS. 2A and 2B are partial fragmented views of a label.
Figure 2B:
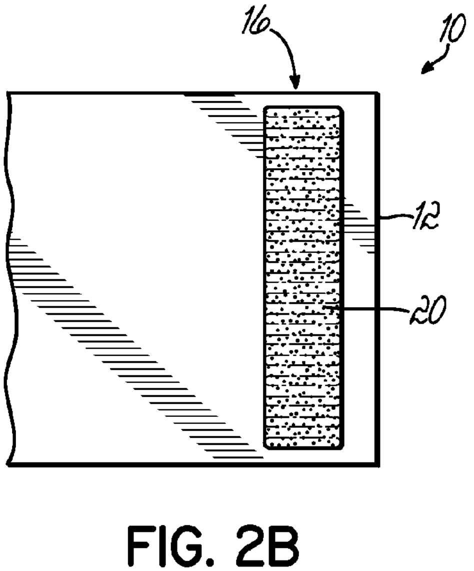

With reference to FIGS. 2A and 2B, in one embodiment, beads of spaced apart adhesive 18 are dispensed, in a non-contact manner, onto the label 10. The beads 18 may remain as beads prior to attachment to the container, or they may coalesce with one another before or after application to the container to produce a general coating of adhesive 20 or even an elongate strip of adhesive. In general the coating of adhesive 20 will be uniform and will approximate the strip of adhesive that is normally seen as resulting from a contact slot gun or a wheel coater.

Figure 3:
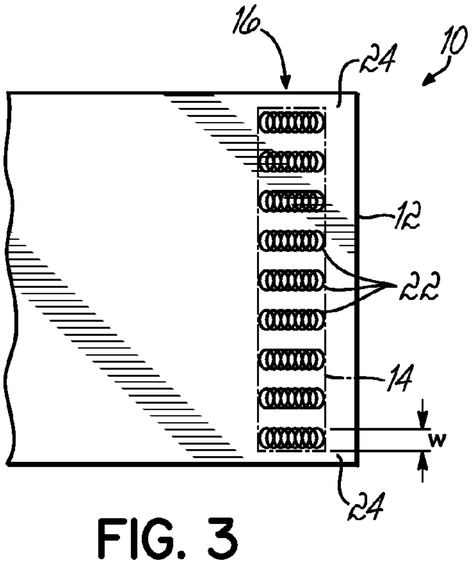
FIG. 3 is a top fragmented view of a label.
Figure 4:
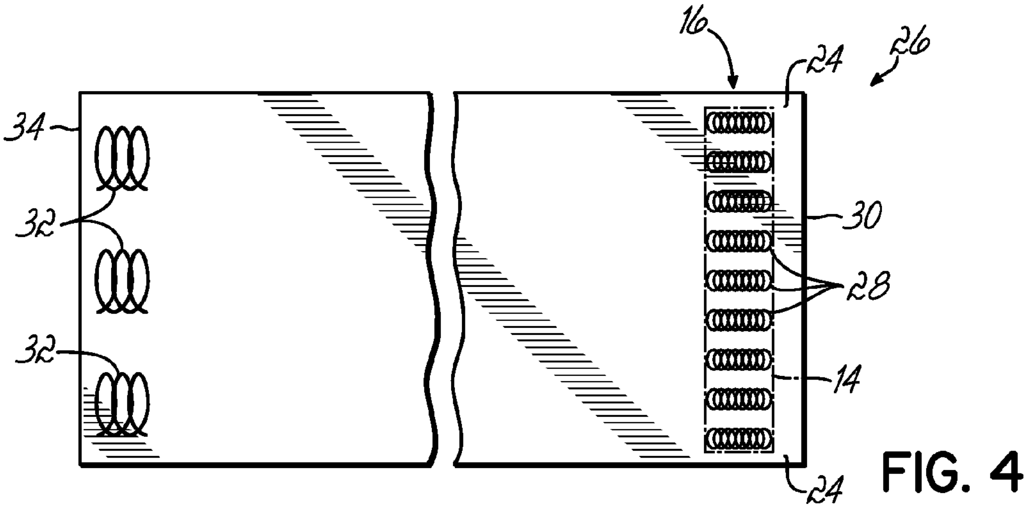
FIG. 4 is a top view of a wrap-around label.

In another embodiment and as shown in FIG. 3, a plurality of continuous beads or filaments 22 of adhesive are dispensed onto the label 10 within the area 14. The swirl of adhesive is preferably sized such that the adhesive is able to readily adhere the corners of the label. To this end, large open pattern swirls (i.e., those having large diameters of swirls) will not adequately cover the corner regions 24 of the label 10 with adhesive because these swirls generally result in the label 10 having peeling edges or dog-ear corners. It has been found that having smaller diameter swirls provides a better coverage of adhesive in these key regions. Furthermore, it has been found that having a plurality of smaller swirl beads 22, as opposed to several large swirls provide a more uniform coating thereby eliminating the large peaks and valleys associated with large open swirl patterns. For example, the width "w" of the swirl or other pattern may be less than 10 mm or, more particularly, within a range of about 5 mm to about 10 mm.

For wrap-around labels, the leading edge of the label (i.e., the edge contacting the container first) does not have the same appearance requirements as the trailing edge. The leading edge needs to be tacked or held in place to the container. The concerns of edge peeling or dog-earing are therefore not an issue because the label itself wraps around and covers the leading edge portion. For leading edge applications in a wrap-around label, less adhesive may be used and larger, more open patterns may be employed. Therefore, the leading edge of the label may have a different pattern than that of the trailing edge. For example, with reference to FIG. 4, the wrap-around label 26 may have a plurality of fine swirl beads 28 spaced from the trailing edge 30 to produce a high quality, aesthetically pleasing seal when applied to a container. The label 26 may also have a reduced number of larger, open swirl adhesive beads or filaments 32 spaced from the leading edge 34 for the tacking operation. Again, adhesive patterns other than those shown may be used instead.

The other patterns of adhesive beads or filaments that may be used, include, but are not limited to: straight lines, a plurality of generally sinusoidal patterns, omega-shaped patterns, or saw tooth patterns. When these or the above patterns are used, the amount of adhesive applied is preferably thin enough so as to prevent "read through" (i.e., the adhesive is not readily apparent from the outside of the label). Swirl, sinusoidal, omega, saw tooth or similar pattern types are referred to herein as generally back and forth patterns.

Figure 5:
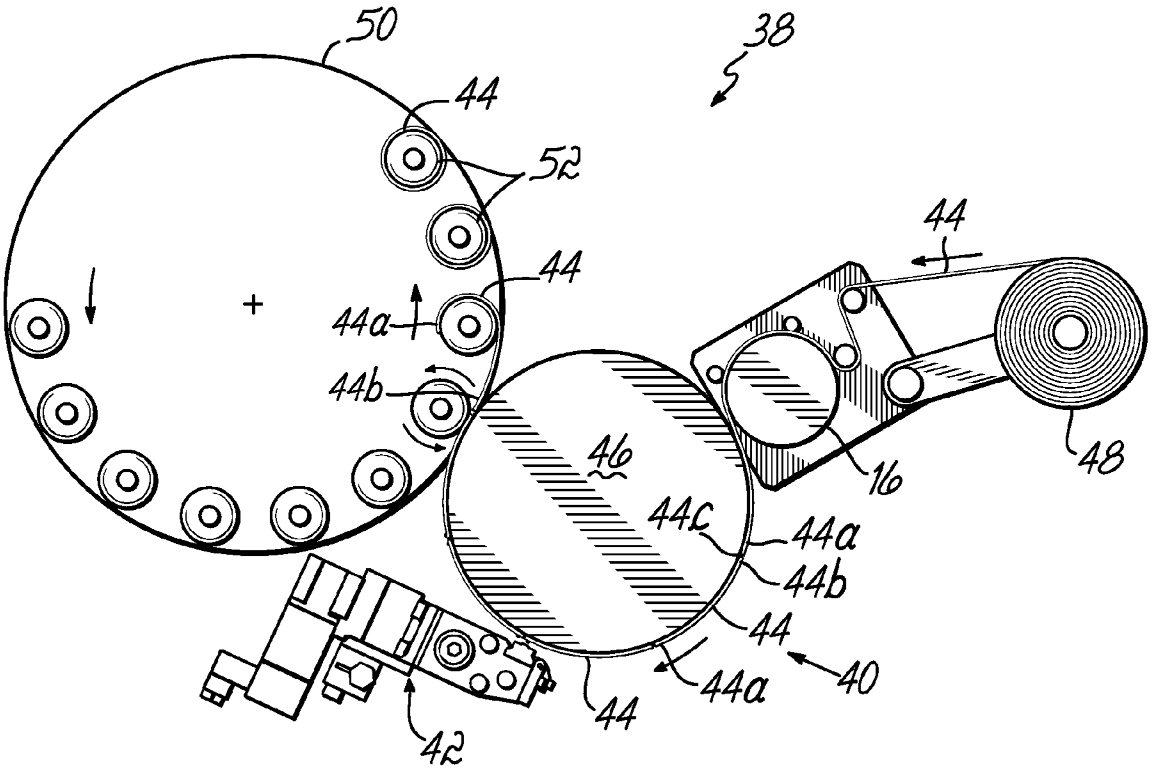
FIG. 5 is a top view of one illustrative embodiment of a roll-fed labeling apparatus constructed in accordance with the invention.

FIGS. 5 and 7-10 illustrate several different labeling apparatus that may be used to create the various adhesive patterns discussed above. For example, FIG. 5 illustrates a labeling apparatus 38 comprising a label delivery mechanism 40 and one or more non-contact dispensing guns 42. The label delivery mechanism 40 is configured to hold a plurality of labels 44 and is operable to deliver individual labels 44 to a conveyor, such as a carousel 50 having bottles or containers 52 positioned thereon. In the embodiment shown in FIG. 5, the dispensing gun 42 is used to apply adhesive to the labels 44 as they are held on a vacuum wheel 46 of the delivery mechanism 40. The gun 42 applies adhesive to both a leading edge portion 44a and trailing edge portion 44*b* of each label 44. More specifically, the gun 42 is cycled on and off to apply a plurality of adhesive patterns to the trailing edge portion 44*b* of one label and then immediately cycled on and off again to apply a plurality of adhesive patterns to the leading edge portion 44*a* of the immediately adjacent label 44 located upstream on the vacuum wheel 46. The labels 44 may be cut from a roll 48 while on the vacuum wheel 46, thereby producing seams 44*c* between adjacent labels. The cycle time of the adhesive gun 42 may be less than about 9 milliseconds and, preferably, between about 5 milliseconds and about 9 milliseconds, and more preferably, less than about 5 milliseconds. The high-speed intermittent operation of the gun 42 therefore enables high production line speeds (i.e., travel of labels 44 around wheel 46) while avoiding application of adhesive over the seam 44*c* between adjacent labels 44 or over the line that will subsequently become the seam 44*c*. For example, labels may be applied to containers 52 at a rate greater than 800 labels per minute, and more preferably, at a rate greater than 1000 labels per minute. Speeds on reel fed machines can be characterized by several variables that lead to the dispensing gun cycle time requirements. For example, gun cycle time will be a function of where the guns are mounted, the production rate, the diameter of the container, number of containers on the carousel wheel or pitch between the containers (especially on in-line machines that do not use a wheel), the diameter of the vacuum wheel and the number of labels on the vacuum wheel. Production rates can range from 250 to 1400 labels/minute or possibly higher. Vacuum wheel diameter can range from approximately 300 mm to 1 m. The positions of the adhesive guns and the ranges described lead to gun on/off cycles in the range of 2 ms to 10 ms or more.

Whenever adhesive is applied to a label 44 adjacent the cut joint or seam 44*c*, the adhesive may advantageously be applied on either or both sides of the cut joint 44*c* and not over the cut joint 44*c* itself. That is, the adhesive may be applied to an area that is spaced from the seam 44*c* by a distance "d" (FIG. 1). The distance may be chosen, for example, so as to preclude the adhesive from squeezing out and being exposed when the label 44 is applied to the container 52. This will avoid various contamination issues and problems that can arise when, for example, adhesive contacts the vacuum wheel 46. This aspect of the invention also helps prevent contamination that arises when adhesive contacts any cutters or razors that are integrated on the vacuum wheel 46.

After the gun 42 applies adhesive, the labels are subsequently applied to the bottles or containers 52 positioned on the rotating carousel 50. The carousel 50 is positioned relative to the vacuum wheel 46 such that the bottles 52 come into contact with the labels 44 after adhesive is applied. To facilitate applying the labels 44, the bottles 52 may be rotated in a direction opposite that of the vacuum wheel 46. It will be appreciated that other types of conveying devices may be used instead of a carousel, such as various in-line conveyors, etc.

Figure 6:
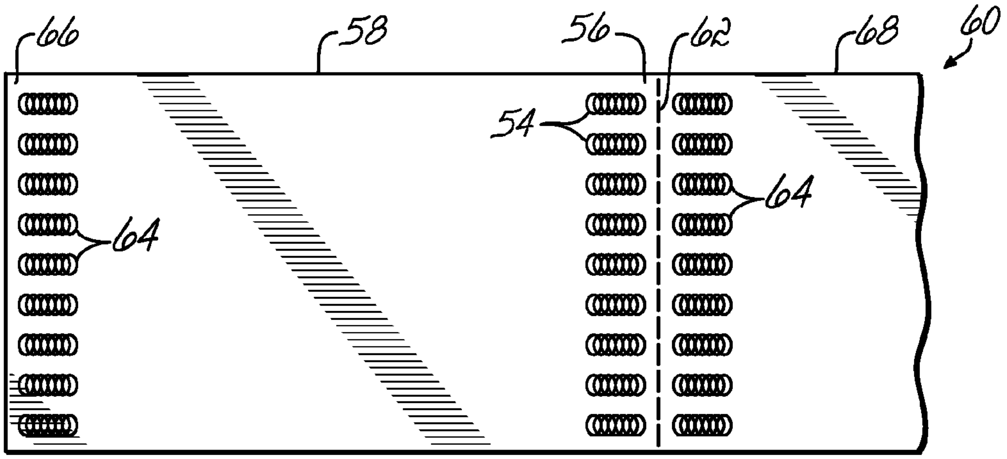
FIG. 6 is a top view of a wrap-around label and a fragmented view of the label roll.

With reference to FIG. 6, in roll-fed labeling operations (such as the one shown in FIG. 5), adhesive 54 may be applied in a non-contact manner to a trailing edge 56 of a label 58 before or after the label is cut from a roll 60. The cut line is generally shown by reference numeral 62. Adhesive 64 may also be applied to a leading edge 66 of the next adjacent label 68. The dispensing of the adhesive 54 and 64 on either side of the cut line 62 may occur before the first label 58 is cut from the roll 60 or it may take place after the cutting operation. The dispensing of the adhesive 54 and 64 may be from two different dispensing guns, or from one gun with multiple orifices.

Figure 7:
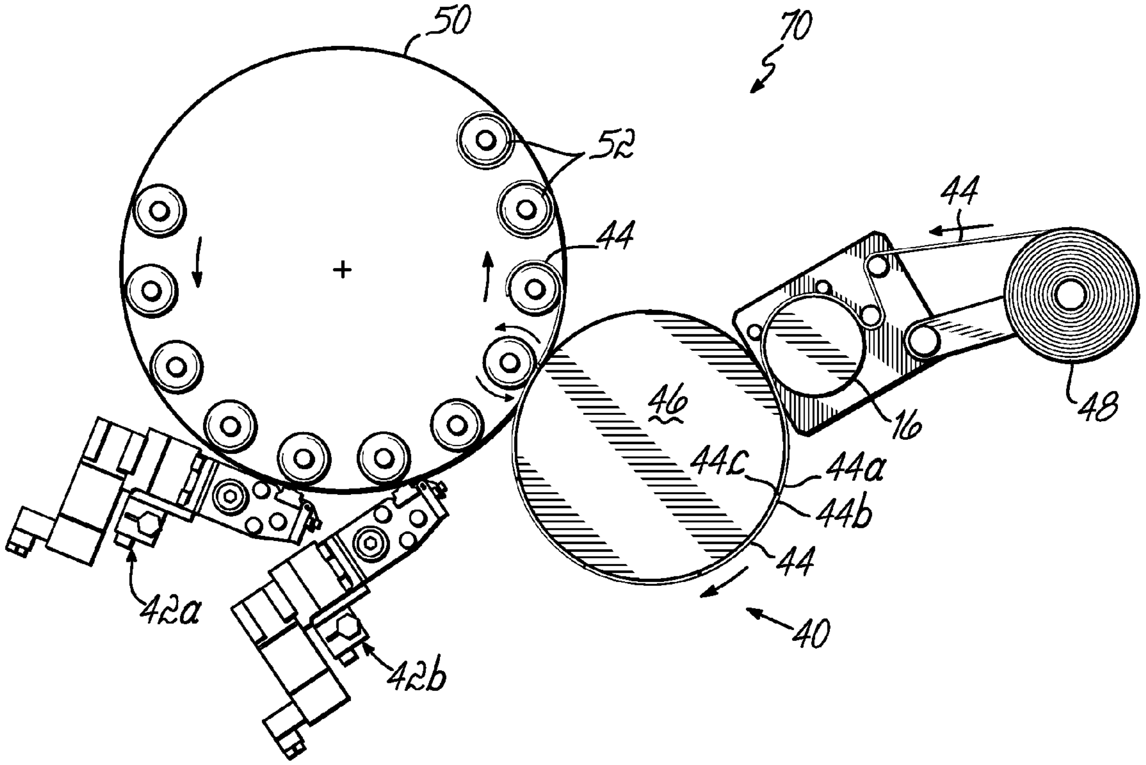
FIG. 7 is a top view of another embodiment of a roll-fed labeling apparatus constructed in accordance with the invention.

FIG. 7 illustrates another labeling apparatus 70 in which non-contact dispensing guns 42*a* and 42*b* are separately used adjacent the carousel 50 to respectively apply adhesive to the areas of the outer surface of each bottle 52 that correspond to and contact the leading edge 44*a* and trailing edge 44*b* of each label 44. This type of apparatus is used for non-wrap-around labeling operations.

Figure 8:
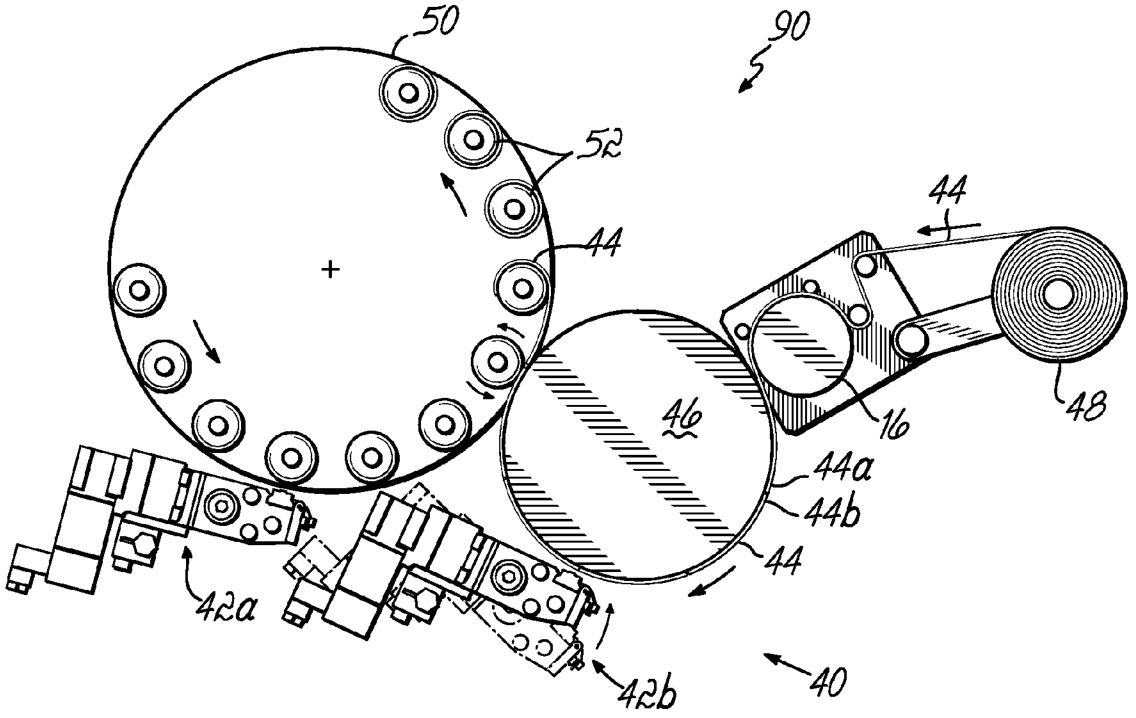
FIG. 8 is a top view of another embodiment of a roll-fed labeling apparatus constructed in accordance with the invention.

FIG. 8 illustrates another labeling apparatus 80 in which a first non-contact dispensing gun 42*a* is located adjacent to the exterior of the carousel 50 for applying adhesive to the areas of the outer surface of each bottle 52 corresponding to and contacting a leading edge portion 44*a* of each respective label 44. A second non-contact dispensing gun or contact slot gun 42*b* is mounted adjacent to the vacuum wheel 46 and may pivot toward the label 44 to apply adhesive to the trailing edge portion 44*b* of each label 44. If a contact slot gun is used, and if necessary, the slot gun may be pivoted away from the labels 44 after each application of adhesive so as to avoid thermally distorting the label material. Instead of pivoting the gun 42*b* towards the trailing edge portion 44*b* of the label 44 on the vacuum drum or wheel 46, a trailing edge vacuum plate (not shown) or other structure on the vacuum drum 46 may cause the trailing edge portion 44*b* of the label 44 to move towards the stationary slot gun 42*b*. This alternative may also be implemented in any other embodiments that utilize a slot gun.

On existing roll feed labeling machines using wheel coaters, containers 52 will generally rotate in the same direction as the carousel 50, even if the machine is equipped with one servo motor for each container or bottle 52. When a non-contact spray gun 42*a*, such as shown in FIG. 8, is used instead of an adhesive wheel coater the bottle may be rotated in a direction opposite to the carousel rotation. In this way, the relative circumference speed of the bottle can be lowered and a better adhesive spray pattern may be applied. After applying the adhesive spray pattern, the speed of the servo motors controlling bottle rotation would then be increased to ensure a correct matching or synchronization of the spray pattern on the bottle 52 with the leading edge portion 44*a* of the label 44 coming off the vacuum drum 46. Of course, this concept may be applied to other embodiments as desired or as necessary.

Figure 9:
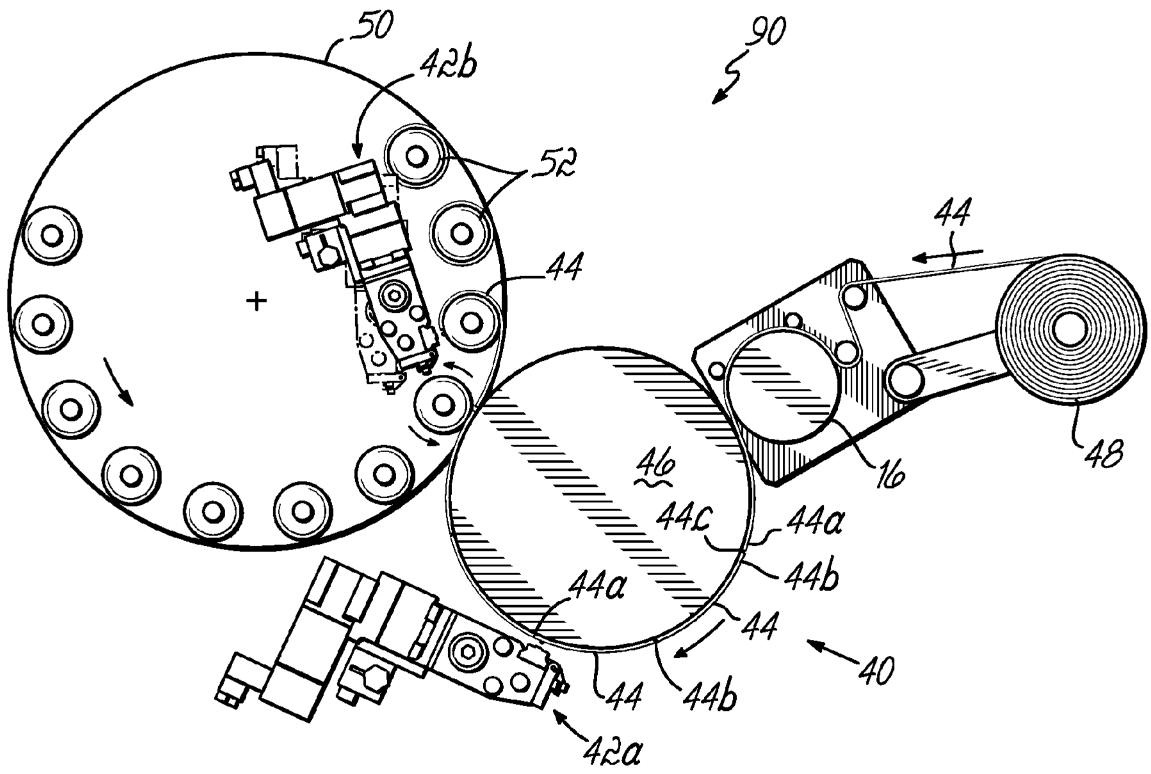
FIG. 9 is a top view of another embodiment of a roll-fed labeling apparatus constructed in accordance with the invention.

FIG. 9 illustrates another labeling apparatus 90 in which a first non-contact dispensing gun 42*a* is mounted adjacent to the vacuum wheel 46 for applying adhesive to the leading edge portion 44*a* of the label 44 that will be applied when the bottle 52 moves directly adjacent to the vacuum wheel 46. A second non-contact or contact dispensing gun 42*b* is mounted within the circumference of the carousel 50 such that adhesive may be directed onto an area of the exterior surface of the bottle or container 52 that corresponds to and will make contact with a trailing edge portion 44*b* of the label 44 being applied to the respective bottle 52. If gun 42*b* is a contact gun, it may be pivoted away from the label 44 after each adhesive dispensing operation to avoid thermal distortion of the label 44. Thus, if the bottles or containers 52 are rotated by separate drive mechanisms, the bottles 52 may be rotated at lower speeds when adhesive is being applied by the second non-contact dispensing gun or slot gun 42*b*.

Figure 10:
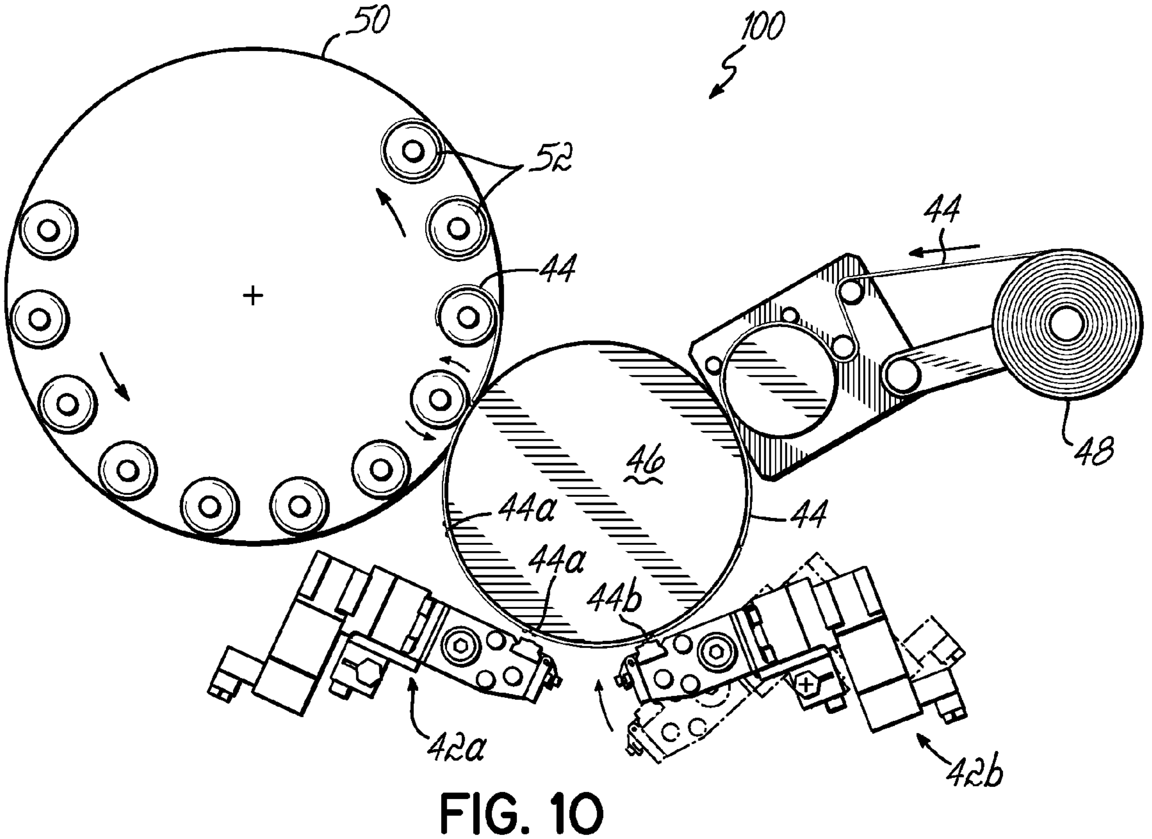
FIG. 10 is a top view of another embodiment of a roll-fed labeling apparatus constructed in accordance with the invention.

FIG. 10 illustrates another labeling apparatus 110 in which two adhesive applicator guns 42*a*, 42*b* are mounted adjacent to the vacuum wheel 46 for respectively applying adhesive patterns to leading and trailing edge portions 44*a*, 44*b* of each label 44. The leading edge portion 44*a* of each label 44 receives an adhesive pattern from a non-contact adhesive applicator gun 42*a*, while the trailing edge portion 44*b* of each label 44 receives adhesive from either a non-contact adhesive applicator or a contact slot gun 42*b*. If a slot gun is used, the slot gun is preferably pivoted away from the labels 44 after each adhesive application so as to avoid thermally distorting the label material.

Figure 11:
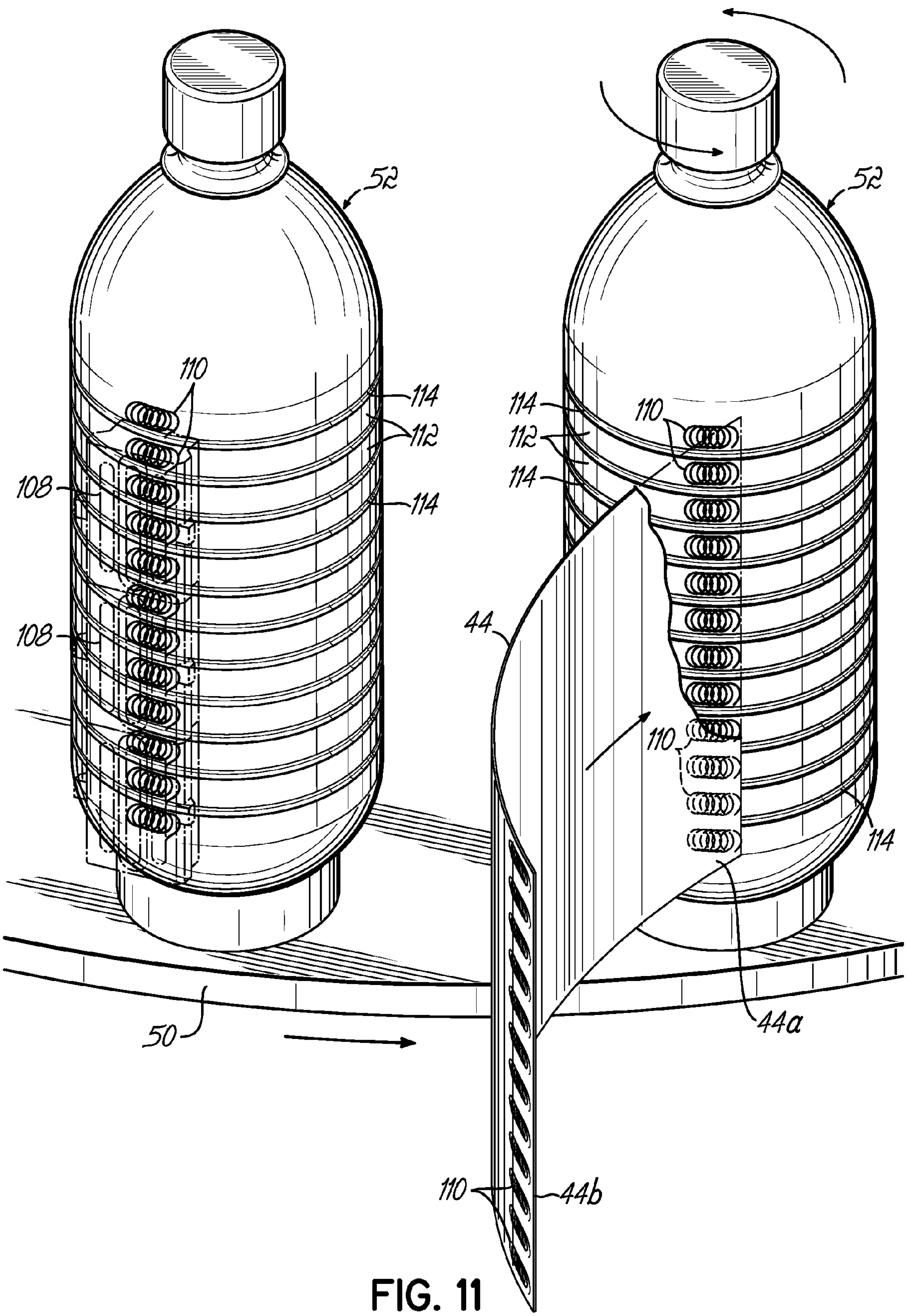
FIG. 11 is a perspective view of a bottle receiving a label with adhesive applied in accordance with the invention and, on a separate bottle, with nozzles superimposed in dash-dot lines to illustrate the position of the nozzles relative to the discharged patterns of adhesive filaments.

FIG. 11 illustrates two of the bottles or containers 52 with representative arrays of filament patterns 110 applied. As shown, these filament patterns 110 will form essentially a linear series of patterns in a column along either leading and trailing edge portions 44*a* , 44*b* of the label 44 itself, or corresponding leading and trailing edge portions of the area on the outside of the container 52 that will receive the label 44, or a combination of these locations. The multiple adhesive patterns 110 are shown in this example as swirl patterns, however, other patterns may be used, including other filaments patterns resulting from the movement of the filament relative to a discharge orifice of the nozzle in flight to the substrate. Such movement may include generally back and forth patterns including swirl patterns, generally sinusoidal patterns, omega-shaped patterns, saw tooth, or other filament patterns that create a wider coverage area than a straight bead or filament pattern would create. Preferably the patterns are applied in a manner to obtain a proper coating weight over a desired area (e.g., area 14 in FIG. 1) when the label 44 is applied to the bottle or container 52. For example, the above-described arrangements may be used to obtain an adhesive coating weight of about 0.002 grams/cm$^2$ to about 0.02 grams/cm$^2$ with at least about 75% of the area defined within the outer boundaries of the individual adhesive filament patterns 110 being covered with adhesive. (See area 14 in FIGS. 1-4). If the leading edge is merely being tacked down in an overlap labeling operation, then larger coverage amounts, such as 75% coverage, are not necessary at that location, but it may still be desired at the trailing edge location. Adhesive weight per label is generally a function of the label performance required. For example, unfilled containers may require more adhesive if they are to be filled later with a carbonated fluid. Variations in ambient temperature and internal pressure lead to the need for greater adhesive weight in such cases.

Applications in which containers are filled with non-gassed fluids may require less adhesive. The height of the label will also have an impact on the amount of adhesive required. The closed dispensing system that supplies adhesive to the non-contact gun or contact slot gun can be closely controlled and adjusted according to line speed variations. Generally, the amount of adhesive necessary in any particular labeling operation will depend on factors such as: adhesive type or formulation, linear speeds of labeling machines due, for example to vacuum wheel size, speed change capability, label design/material, container or object design/material, adhesive swirl or other pattern characteristics, and product characteristics such as carbonated liquid contained in bottles before or after labeling. In general, adhesive coverage can be between about 25% and about 100% of the area bounded by outer boundary lines of the applied individual adhesive filament patterns.

In accordance with a further aspect of the invention, nozzles 108 are used that include a plurality of discharge orifices (i.e., one orifice for producing each filament pattern 110). This allows tighter or closer spacing of adhesive filament patterns 110, as shown in FIG. 6, than would be possible by the use of a nozzle having only a single dispensing orifice. Nozzles useful for achieving this are disclosed in U.S. Pat. Nos. 6,938,795 and 6,651,906, and in U.S. Published Application No. 2005/0167529, each assigned to the assignee of the present invention and the disclosures of which are hereby fully incorporated by reference.

Additionally, the nozzles 108 may be configured to apply adhesive to particular areas on the bottle or container 52. This aspect is particularly advantageous when applying adhesive directly to a bottle 52 having one or more peaks or ridges 112 and valleys or grooves 114. For example, the nozzles 108 may be configured to apply the adhesive pattern primarily upon the peaks 112. This represents an improvement over wheel coaters, which typically apply adhesive to cover a uniform height above the peaks. Wheel coaters therefore fill the valleys 114, which often results in too much adhesive being applied and an undesirable appearance.

Figure 12:
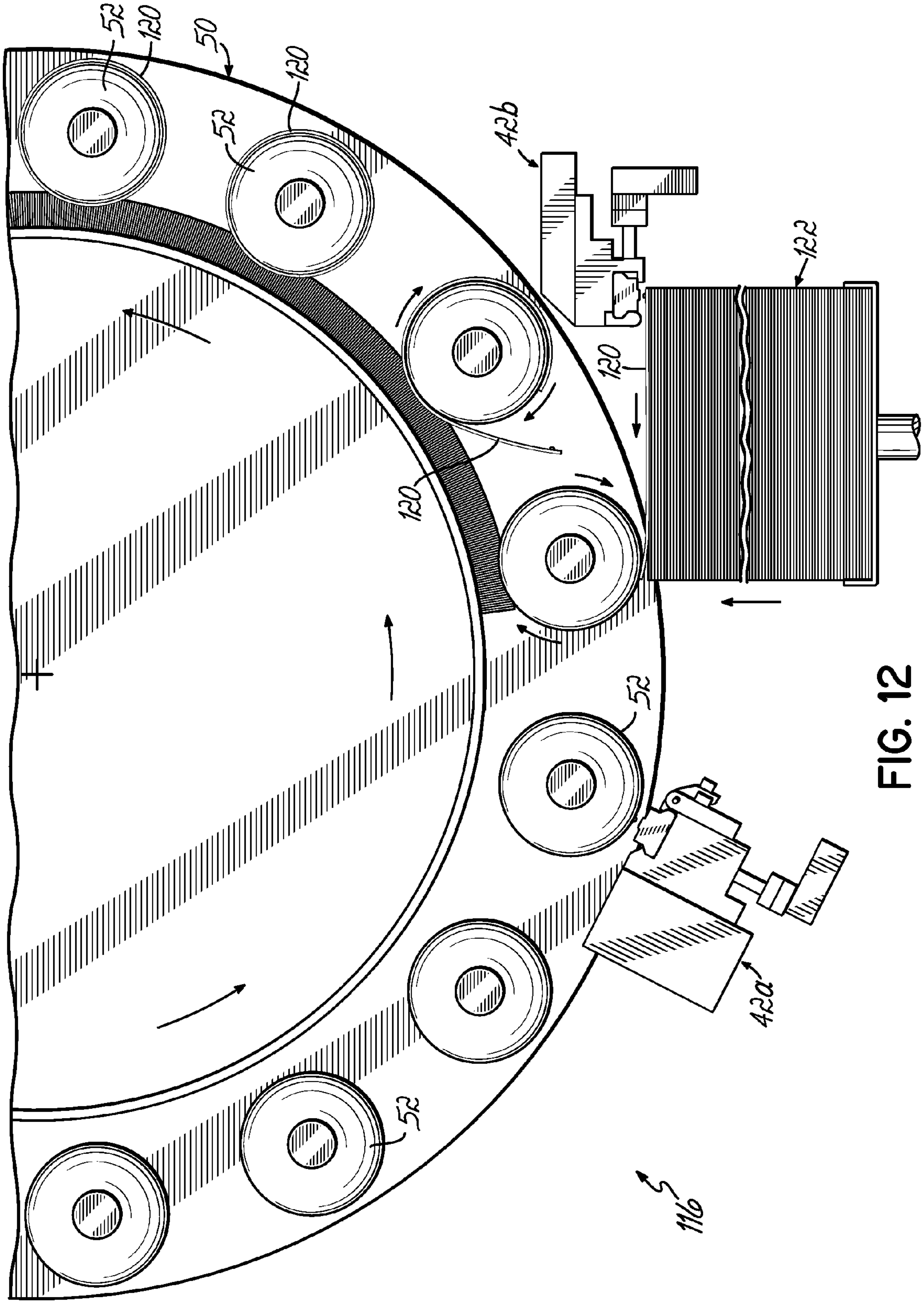
FIG. 12 is a partially fragmented top view of another embodiment of the invention illustrating a cut and stacked labeling system using non-contact adhesive spray applicators.
Figure 13:
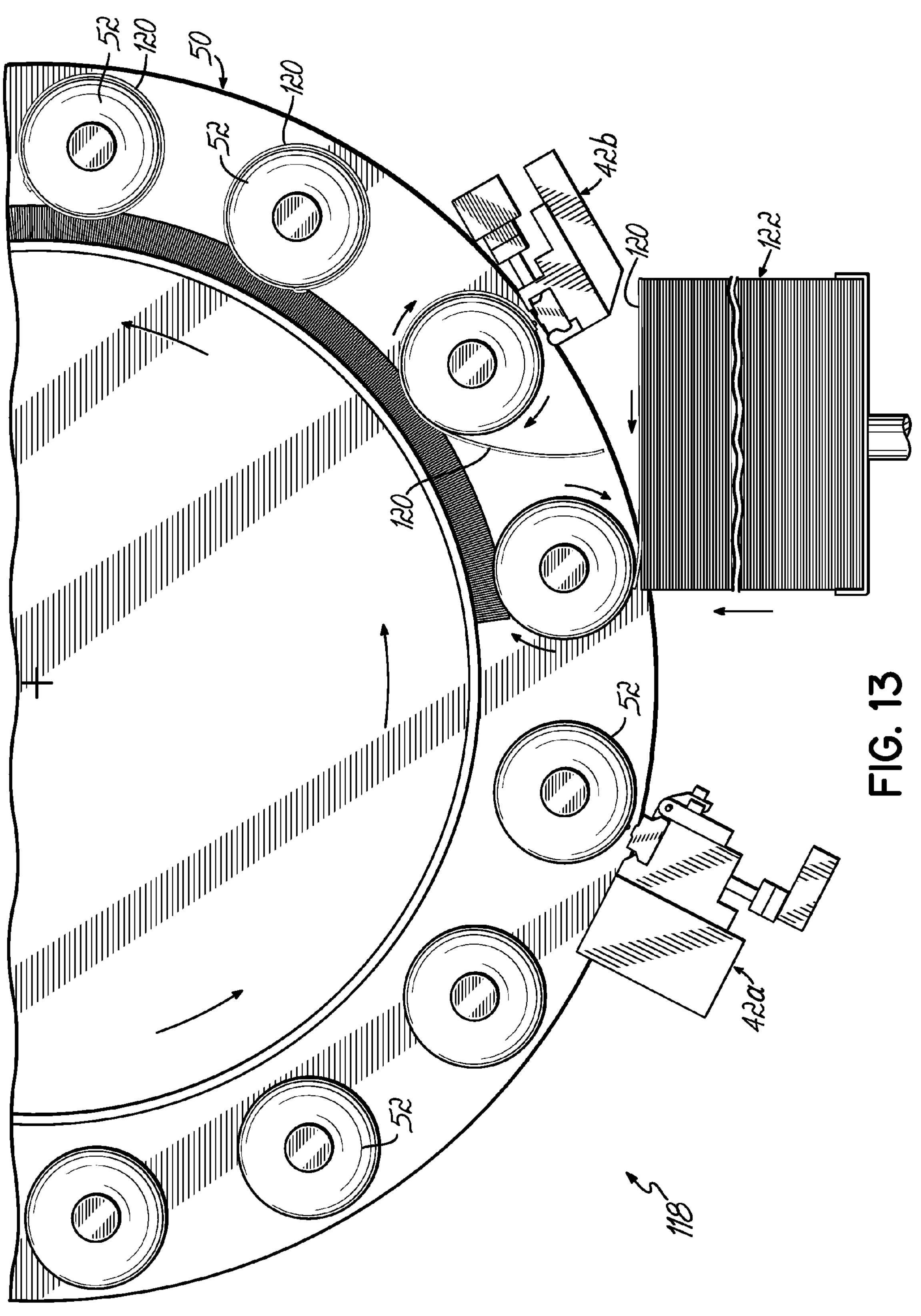
FIG. 13 is a partially fragmented top view similar to FIG. 12, but illustrating another embodiment of a cut and stacked labeling apparatus.

FIGS. 12 and 13 illustrate respective labeling apparatuses 116, 118 utilizing non-contact dispensing guns 42*a*, 42*b* to apply cut and stacked labels 120 from a magazine 122. To this end, as the bottles or containers 52 move along the carousel 50, the dispensing gun 42*a* applies adhesive in a non-contact manner to a leading edge portion of the exterior of the bottle 52 corresponding to a leading edge portion of the label to be attached to that bottle 52. As the bottle 52 passes the magazine 122 and comes into contact with the uppermost label 120 in the stack, the applied adhesive picks up the leading edge of the label 120 and the label 120 begins to wrap around the bottle 52. The second non-contact dispensing gun 42*b* then applies adhesive to a trailing edge portion of the label 120. Optionally, as shown in FIG. 13, the adhesive may be applied by non-contact adhesive applicator gun 42*b* to a portion of the outer surface of each bottle 52 corresponding to and coming into contact with the trailing edge portion of the corresponding label 120.

Figure 14:
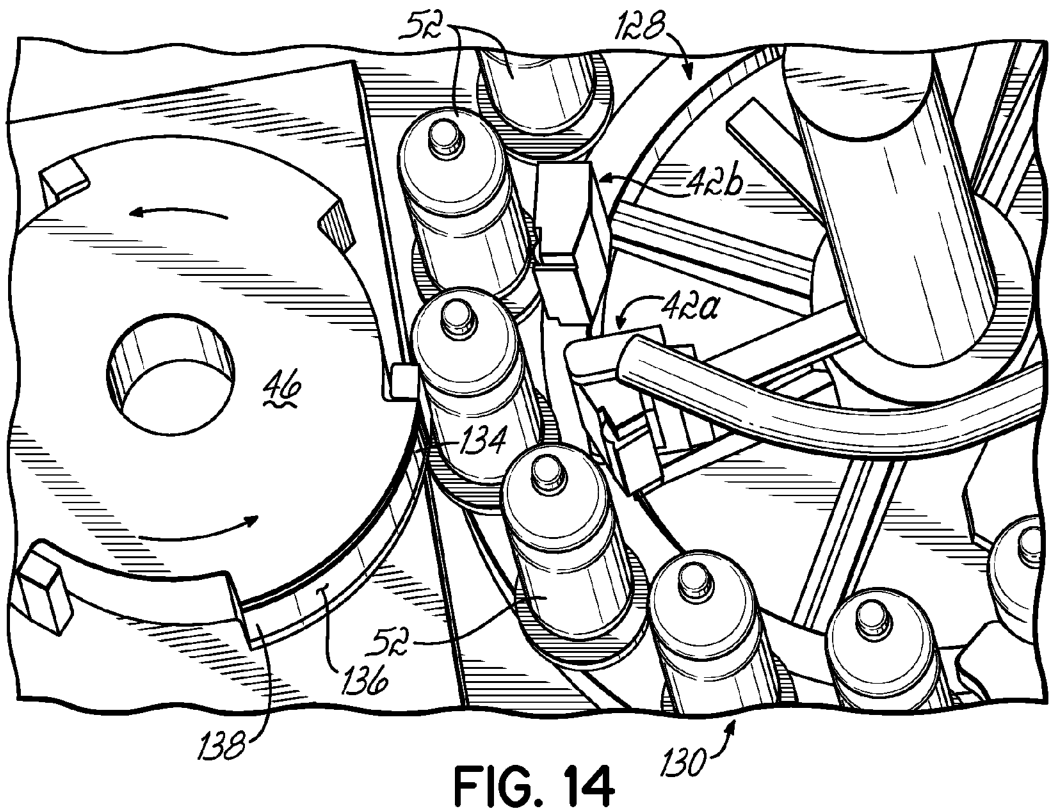
FIG. 14 is a top perspective view of another embodiment of a labeling apparatus utilizing a carousel.
Figure 15:
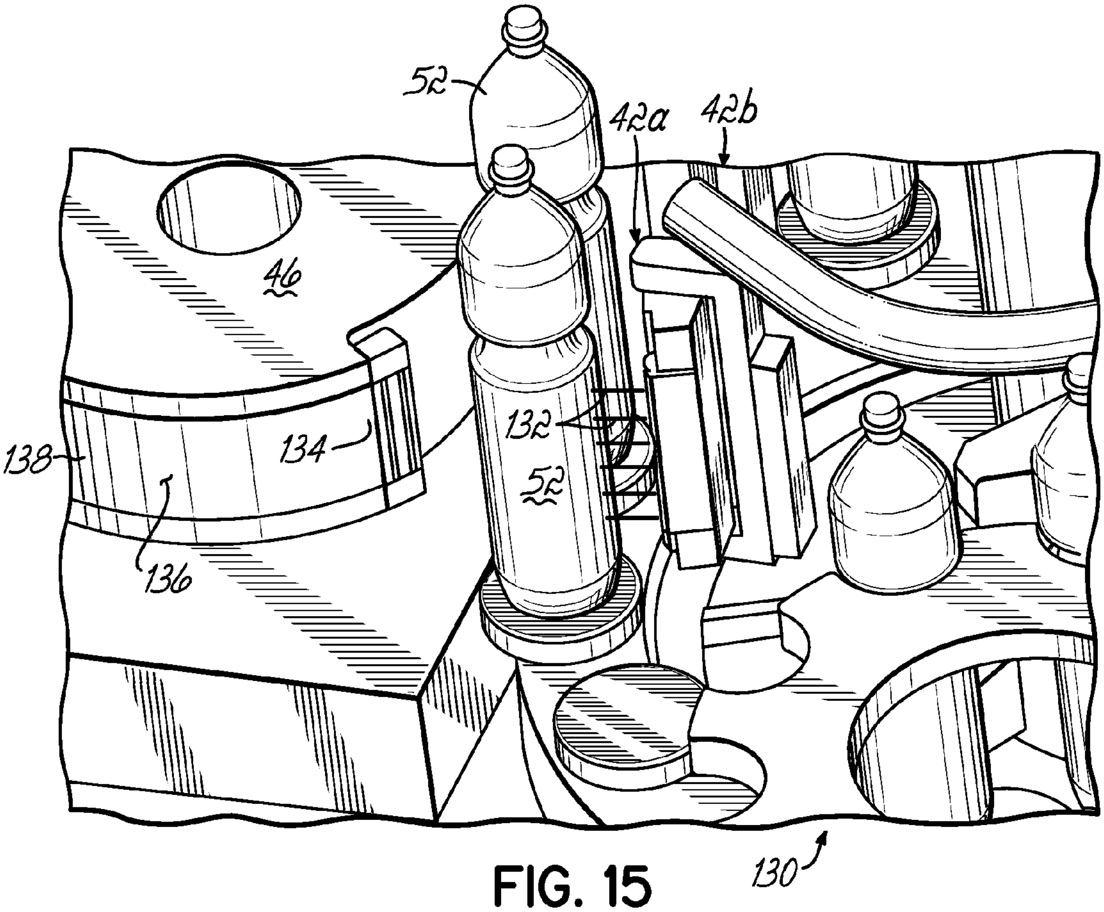
FIG. 15 is a top perspective view of the labeling apparatus of FIG. 14.
Figure 16:
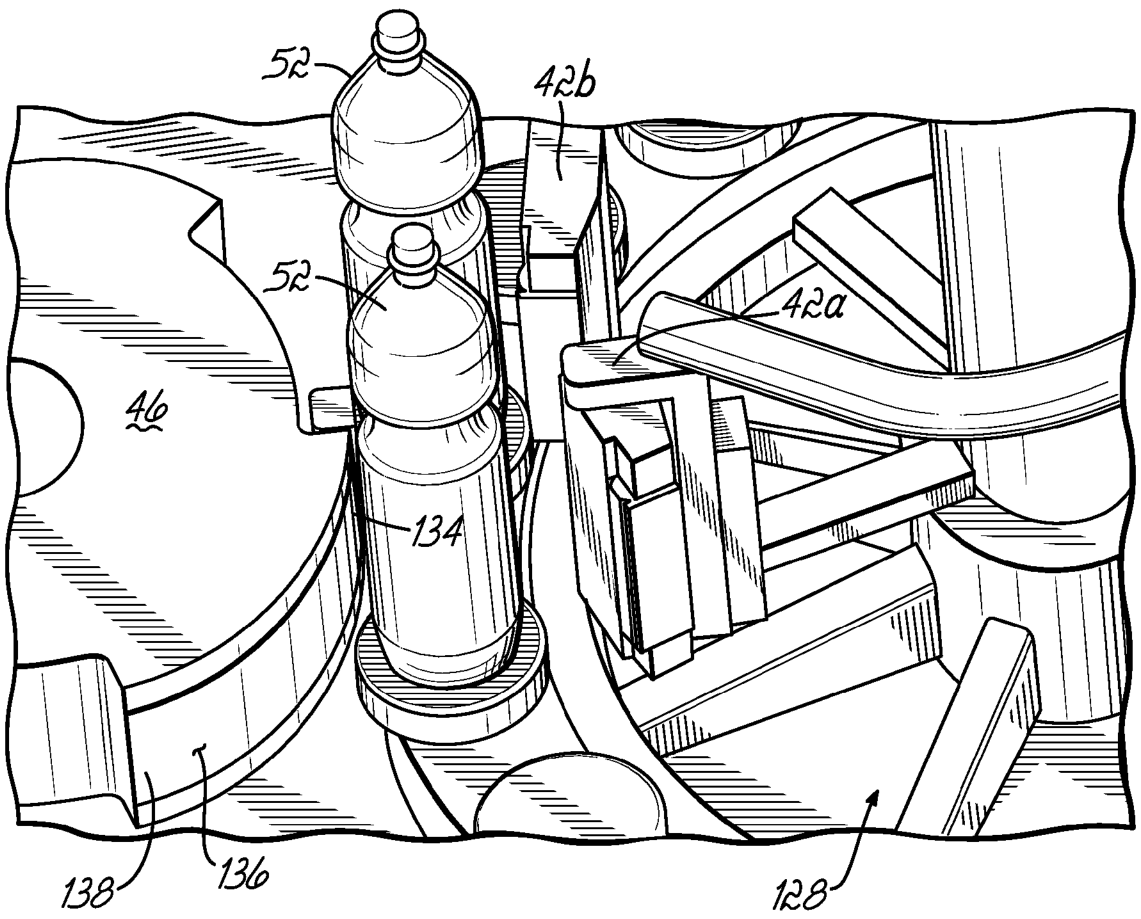
FIG. 16 is an enlarged view of the fragmented view of the labeling apparatus of FIGS. 14 and 15.

Although the embodiments discussed above show at least one of the dispensing gun or guns 42 being positioned adjacent the carousel 50, the dispensing gun 42 or dispensing guns 42*a*, 42*b* may all be mounted within the interior of the carousel 50. For example, FIGS. 14-16 show adhesive dispensing guns 42*a*, 42*b* located within a carousel 128 of a labeling machine 130. One dispensing gun 42*a* may apply adhesive 132 directly to the container, such as a bottle 52. As the bottle 52 is moved and rotated, it will come into contact with a leading edge 134 of a label 136 which in turn causes the label to attach to the bottle 52 and be transferred from the label carrying mechanism, such as from the vacuum wheel 126.

The other dispensing gun 42*b* may either then apply adhesive directly onto the bottle 52 for attaching the trailing edge 138 of the label 136 to the bottle 52 or it may be applied directly to the label 136 in wrap-around applications. Mounting of the guns 42*a*, 42*b* within the carousel 128 may be used for cut and stack labeling machines, as well as for reel or roll feed labeling machines. Although both dispensing guns 42*a*, 42*b* are preferably non-contact dispensing guns, the gun 42*b* for affixing the trailing edge of the label may alternatively be a contact gun, such as a slot nozzle contact gun.

Each dispensing gun 42 in the embodiments discussed above may be supplied with hot melt adhesive by a melter unit and suitable heated hoses (not shown). It is believed that a suitable gun for use in any embodiment of the invention is the SPEEDCOAT® gun available from Nordson Corporation, in Westlake, Ohio, the assignee of the present invention. More particularly, a gun or guns as disclosed in U.S. patent application Ser. No. 11/000,803 or U.S. Pat. No. 6,669,057 may be utilized for the dispensing guns of the present invention, keeping in mind that modifications may be made to the dispensing pattern and general configuration of the nozzles and other parts of the gun depending on the needs of any particular labeling operation. The disclosures of U.S. patent application Ser. No. 11/000,803 and U.S. Pat. No. 6,669,057 are hereby fully incorporated by reference. Other guns, such as lower speed guns, may be used as permitted by the application needs. Various adhesive patterns may be applied, such as various types and sizes of swirls, adhesive beads, dots, and any other patterns.

Figure 17:
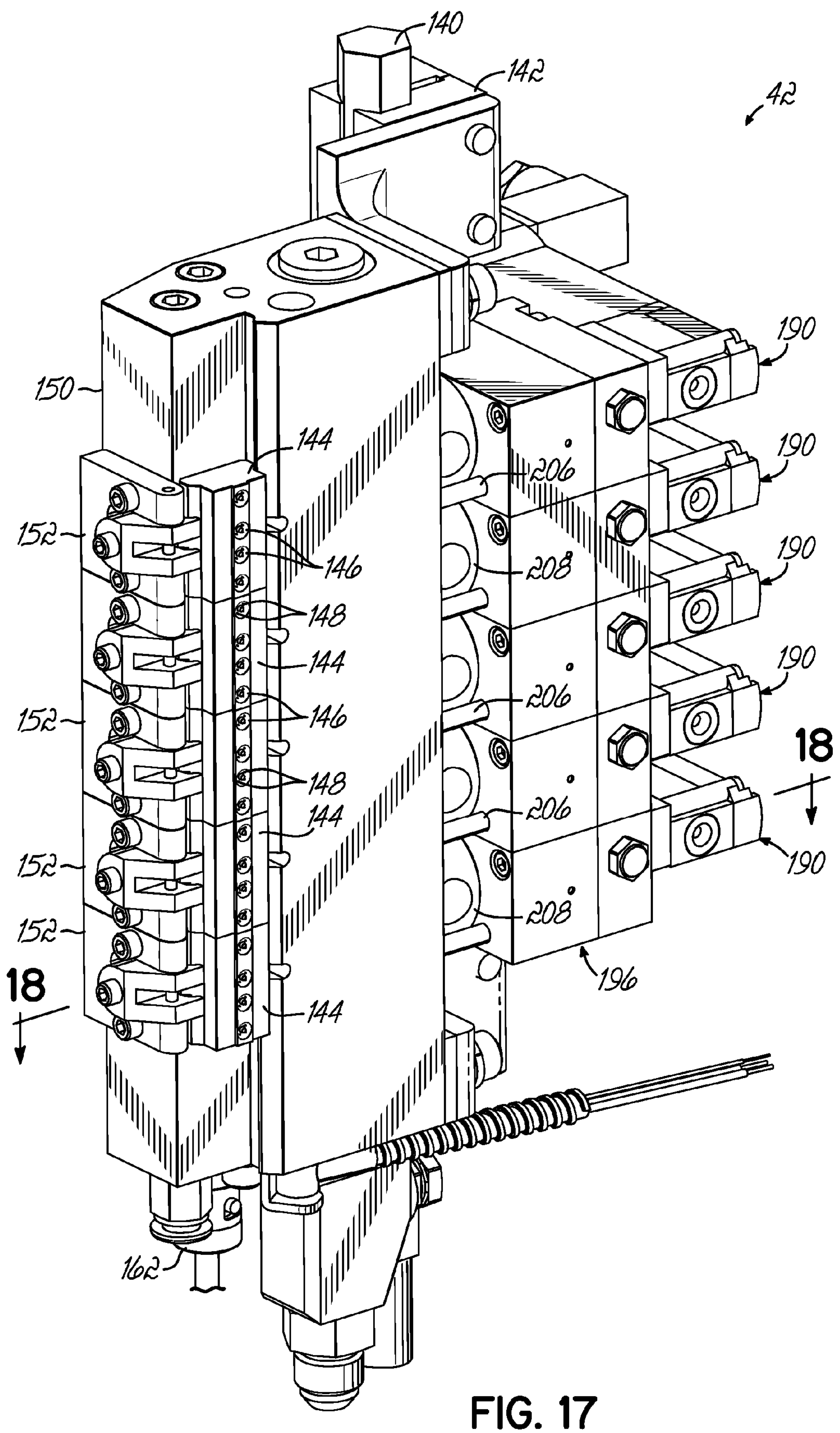
FIG. 17 is a perspective view of a non-contact adhesive filament applicator constructed in accordance with one embodiment.
Figure 18:
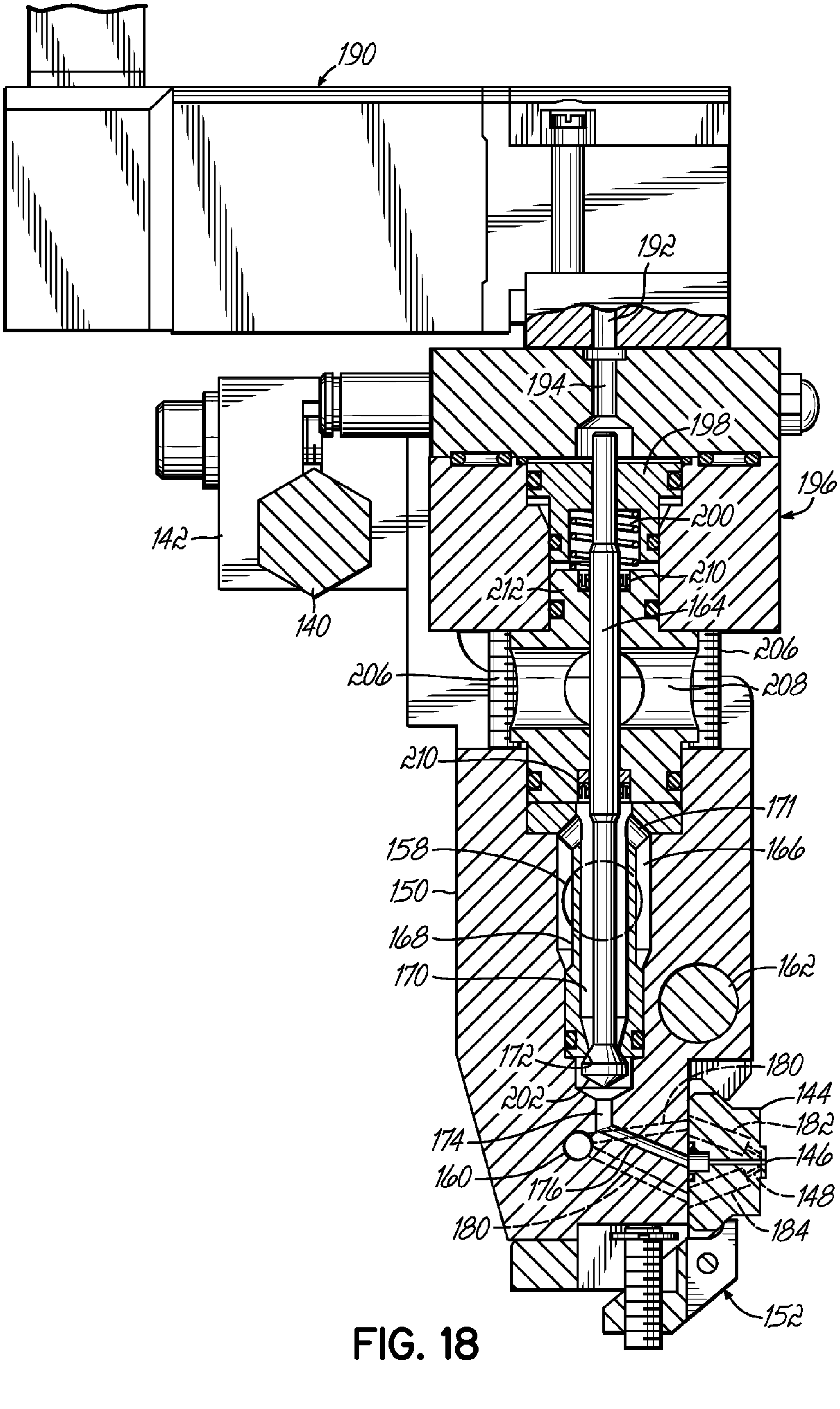
FIG. 18 is a cross sectional view taken along line 18-18 of FIG. 17 illustrating the valve stem in a closed position.
Figure 19:
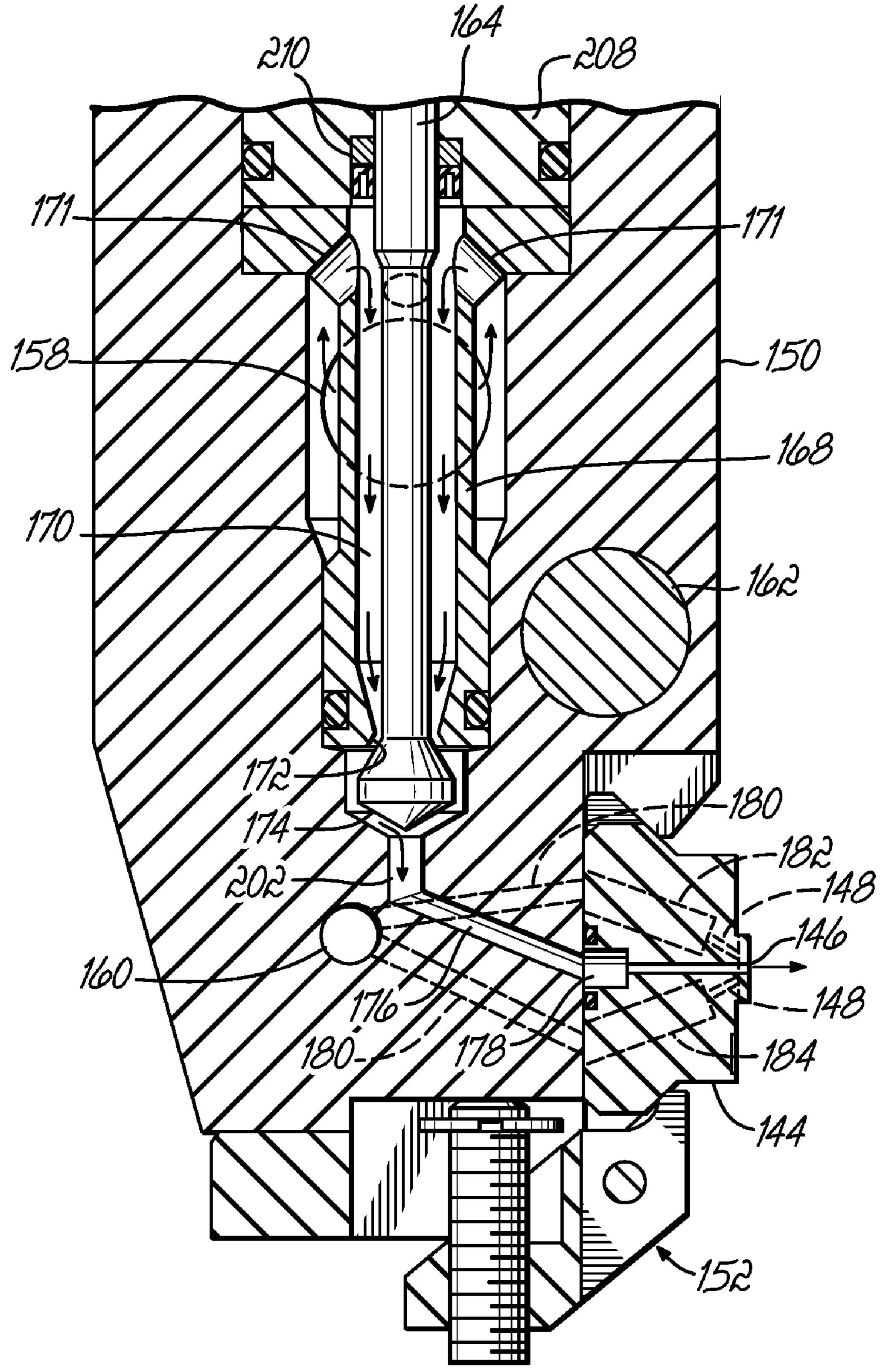
FIG. 19 is an enlarged cross sectional view of the discharge end of the applicator of FIG. 18 showing the valve stem in an open position.

One embodiment of the dispensing gun or non-contact spray applicator 42 is shown in more detail in FIGS. 17-19. With reference to FIG. 17, the spray applicator 42 may be mounted vertically on a suitable support bar 140 using clamp structures 142 and includes one or more nozzles 144. Each nozzle 144 has a plurality of adhesive discharge orifices 146 and associated process air orifices 148 for forming a dispensed adhesive filament into a desired pattern. It will be appreciated that each nozzle 144 receives adhesive from one of a plurality of adhesive valves, as described below with reference to FIGS. 18 and 19. The other adhesive valves may be identical and, therefore, additional description is not necessary. Nozzles 144, for example, are configured to discharge many swirl patterns of adhesive filaments. Nozzles 144 may be secured to a valve body 150 of applicator 42 in any suitable manner, such as by using the illustrated quick-connectors 152.

As illustrated best in FIGS. 17 and 18, valve body 150 includes an adhesive inlet 158 and a process air inlet 160. Another passage may include a suitable cartridge heater 162 for heating the liquid hot melt adhesive and the pattern air to the appropriate operating temperature. The valve body 150 contains a valve stem 164 associated with each nozzle 144 and mounted for reciprocation within a passage 166 having a valve seat insert 168. The liquid hot melt adhesive flows into a central passage 170 in the valve seat insert from the inlet 158 and through passages 171 in the insert 168 communicating with central passage 170. A valve seat 172 is located at a downstream end of insert 168. Additional passages 174,176 communicate with a common passage 178 in the nozzle 144, which feeds each outlet or orifice 146. When the valve stem 164 is in the open position (FIG. 18), the liquid hot melt adhesive may flow through these passages and discharge from the nozzle outlet 146. The amount of adhesive discharged through the outlet 146 will partly depend upon the adhesive pressure within the nozzle body 150. Thus, the gun 42 can adjust to changes in line speed of roll-fed labels by increasing or decreasing pressure at which adhesive is supplied to the nozzle 144.

Pattern or process air discharge passages 180 in the valve body 150 and passages 182,184 in the nozzle 144 respectively communicate with each other and with the process air supply passage 160. Accordingly, process air is supplied through the outlets 148, adjacent to the adhesive as the adhesive exits the discharge orifices 146. The process air may be switched on and off using any suitable valve, for example, including the same solenoid valve 190 (discussed below) used for on/off cycling of adhesive. Alternatively, process air switching could be accomplished via a switching component that is not part of applicator 42. One process air switch (e.g., solenoid valve) may be provided for an entire gun or applicator 42, or individual process air switches may be provided for one or more of the individual adhesive valves contained within valve body 150. Of course, in addition to pneumatic actuation, adhesive and/or process air actuation may take place through the use of any other mechanism(s) including, for example, any other mechanically activated mechanisms (e.g., a rotating shaft for adhesive and spray air actuation) and/or electrically activated mechanisms. In many applications, and particularly in roll-fed applications, it is advantageous to heat the process air before it is supplied to the air inlet 160. Thus, the process air may be heated by a heater (not shown) positioned proximate to the gun 42 and communicating with the air inlet 160. The heater may be cycled on and off in the same manner as the gun 42. To reduce lag issues, the heater is preferably positioned close to the air inlet 160 and may even be mounted to the gun 42.

To reciprocate the valve stem 164 and thereby prevent further discharge of adhesive, pressurize air is introduced into the valve body 150 by actuating a solenoid valve 190. More specifically, actuation air is selectively introduced from a passage 192 in the solenoid valve 190 and into a passage 194 in an air actuating section 196 of the applicator 42. The valve stem 164 is rigidly fixed to a movable piston 198 that is normally retained in the closed position (with the valve stem 164 moved upwardly against the valve seat 172) by a coil spring 200. When pressurized air is introduced through the passages 192,194 and against an upper end of the piston 198, this drives the piston 198 and spring 200 downwardly to move the valve stem 164 and a valve closure element 202 away from the valve seat 172. The air actuating section 196 and the valve body section 150 are coupled together by threaded fasteners 206 and a stand-off element 208 that serves as a thermal barrier to keep the heated valve body section 150 spaced away from the air actuating section 196. Suitable seals 210, 212 are used to provide liquid and air seals against the reciprocating valve stem 164 thereby preventing leakage of pressurized air from the air actuating section 196 and leakage of pressurized hot melt adhesive from the liquid passage 170 in the valve body 150. To close the valve element 202 against valve seat 172, the actuation air pressure is reduced allowing spring 200 to force piston 198 and stem 164 upwardly. This produces a snuff back effect at the adhesive orifices to prevent adhesive drool or drip after shut-off.

The arrangement discussed above enables the nozzles 144 to be selectively operated to produce adhesive filaments. In particular, each nozzle 144 is controlled by an associated solenoid actuator 190 and includes its own feed passages 174, 176,178 and adhesive discharge orifices 146. Different nozzles can therefore be actuated at different times so that the gun 42 applies different patterns of adhesive to the leading and trailing edges of a label. For example, five nozzles 144 are shown in the embodiment in FIG. 17. If the gun 42 is arranged as shown in FIG. 5, two of the nozzles may be actuated to apply adhesive to the leading edge 44*a* of a label 44 and then all five nozzles may be actuated to apply adhesive to the trailing edge 44*b*. Controlling the nozzles in such a manner may result in the pattern shown in FIG. 4 and be particularly advantageous for wrap-around labels.

Figure 20:
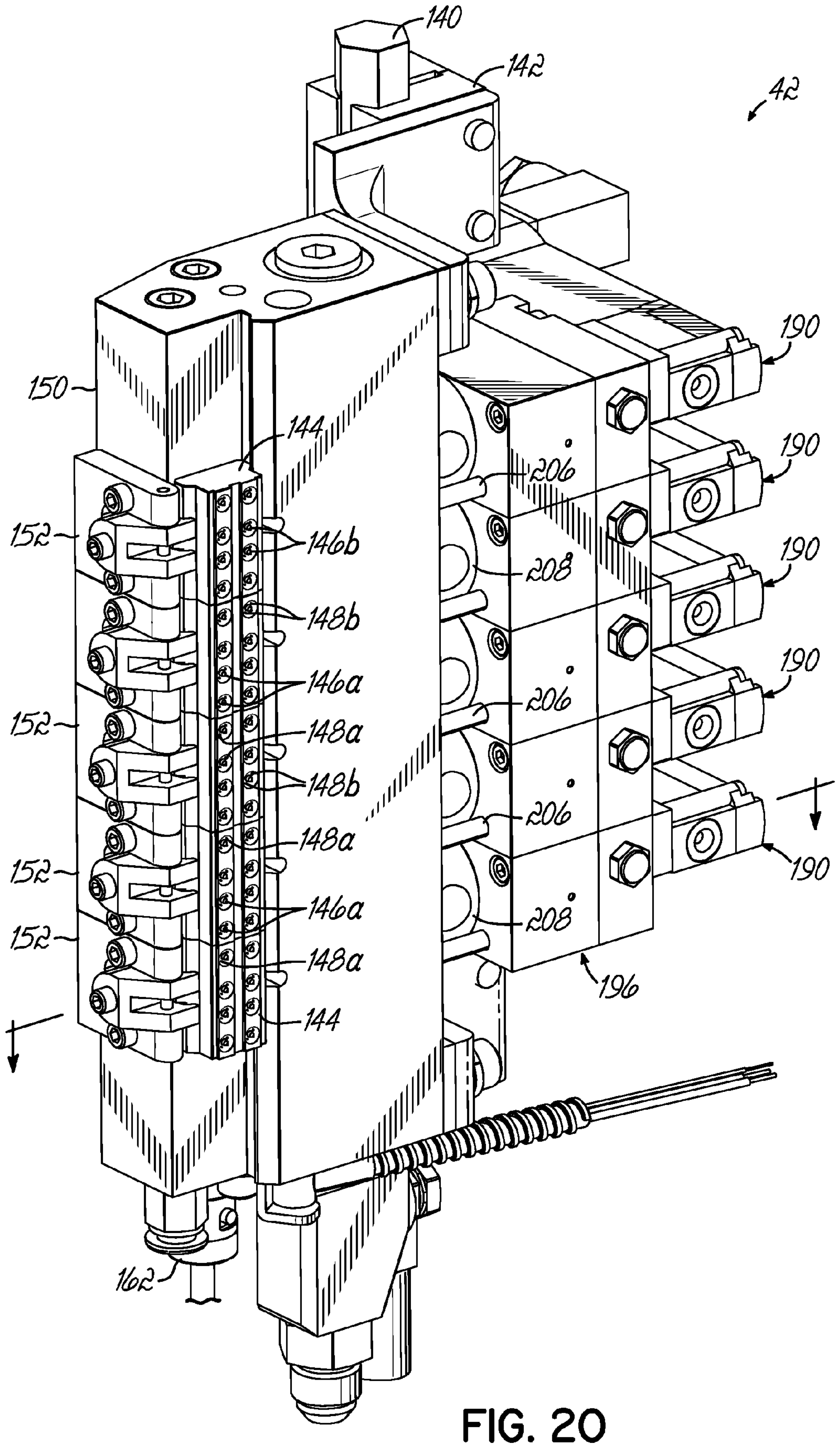
FIG. 20 is a perspective view of a non-contact adhesive filament applicator according to another embodiment.

With reference to FIG. 20, an alternative embodiment of the dispensing gun or non-contact spray applicator 42 is shown. In this embodiment, each nozzle 144 includes first and second rows of adhesive discharge orifices 146*a*, 146*b*. The nozzles 144 may also include associated first and second rows of process air orifices 148*a*, 148*b*. Such an arrangement enables the gun 42 to dispense swirled patterns of adhesive filaments onto the trailing edge of one label and the leading edge of the next label in a single operation. For example, when the dispensing gun 42 is arranged as shown in FIG. 1, the first row of discharge orifices 146*a* may be used to apply adhesive to the trailing edge portion 44*b* of a label 44 while the second row or discharge orifices 146*b* may be used to simultaneously apply adhesive to the leading edge portion 44*a* of the next label on the vacuum wheel 46. Thus, the discharge orifices 146*a*, 146*b* apply adhesive only half the number times as the orifices 146 in the embodiment shown in FIGS. 17-19 for each label. Such a feature allows the applicator to be designed and operated to have higher cycle times while maintaining the same production line speed. The applicator will also have longer life.

While the present invention has been illustrated by the description of one or more embodiments thereof, and while the embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and method and illustrative examples shown and described. Accordingly, departures may be made from such details without departing from the scope or spirit of the general inventive concept.

What is claimed is:

1. A method of applying adhesive to labels, the method comprising:

cycling an adhesive applicator open and closed to dispense adhesive from a plurality of orifices spaced from a first label and a second label adjacent the first label;

contacting the adhesive with the first label at a plurality of spaced apart locations, each location spaced from a trailing edge of the first label to form a first pattern of adhesive such that the space between the first pattern of adhesive and the trailing edge of the first label is void of adhesive; and contacting the adhesive with the second label at a plurality of locations spaced from a leading edge of the second label to form a second pattern of adhesive such that the space between the second pattern of adhesive and the leading edge of the second label is void of adhesive;

wherein the adhesive is applied to the trailing edge of the first label and the leading edge of the second label simultaneously.

2. The method of claim 1, wherein the adhesive applied at the plurality of locations coalesces to form a coating of adhesive.

3. The method of claim 2, wherein the coating of adhesive is an elongate strip of adhesive.

4. The method of claim 1, wherein the adhesive is dispensed at the spaced apart locations as beads or filaments in one of the following forms:

a line;

swirls;

sinusoidal;

omega-shaped;
saw-toothed; or
back and forth.

5. The method of claim 1, wherein the distance the adhesive is spaced from the trailing edge of the first label is sufficiently large to prevent the adhesive from being squeezed out and being exposed when the first label is applied to an object.

6. The method of claim 1, wherein the adhesive is applied in a manner sufficient to eliminate peaks or valleys of adhesive that can be readily visible or felt after the first label has been applied to an object.

7. The method of claim 1, wherein the adhesive is applied to the first label at the plurality of spaced apart locations as small diameter swirls of fine beads of adhesive.

8. The method of claim 1, further comprising:
dispensing the adhesive in a corner formed between the trailing edge of the first label and an adjacent edge of the first label.

9. The method of claim 1, wherein the pattern of adhesive approximates the pattern of adhesive applied from a contact slot nozzle or wheel coater on the same area.

10. The method of claim 1, further comprising:
applying respective patterns of adhesive to multiple labels at a rate greater than 800 labels per minute.

11. The method of claim 1, further comprising:
applying respective patterns of adhesive to multiple labels at a rate greater than 1,000 labels per minute.

12. The method of claim 1, wherein the adhesive is dispensed in overlapping swirls having a diameter in the range of about 5 mm to about 10 mm.

13. The method of claim 1, wherein the adhesive is dispensed with coating weight in the range of about 0.002 to about 0.02 grams/cm$^2$.

14. The method of claim 1, wherein the pattern of adhesive covers 75% to 100% of the area approximating that of a contact slot nozzle or wheel coater.

15. The method of claim 1, further comprising the step of applying adhesive to a leading edge of the first label.

16. The method of claim 1, further comprising the step of applying adhesive to an object receiving the first label.

17. The method of claim 1, further comprising the step of applying the first label to an object.

18. The method of claim 1, wherein the label is delivered from a label delivery mechanism comprising one of the following:
a roll-fed labeling mechanism; or
a magazine-fed labeling mechanism.

19. The method of claim 1, wherein the plurality of orifices are associated with a first adhesive applicator including a plurality of nozzles.

20. The method of claim 19, wherein said plurality of nozzles are independently operable.

21. The method claim 20, wherein the plurality of orifices of said nozzles are linearly aligned and configured to discharge filaments of adhesive to form a column of closely spaced adhesive filament patterns.

22. The method of claim 19, wherein each nozzle comprises two individual rows of adhesive discharge orifices with a plurality of adhesive discharge orifices in each row.

23. The method of claim 1, further comprising:
carrying objects on a conveyor adjacent to the label.

24. A method of adhering individual labels to individual objects, comprising:
moving the individual objects along a conveyor;
positioning the labels adjacent to the conveyor;
intermittently applying adhesive from a plurality of orifices in a nozzle of a non-contact adhesive applicator onto either the labels or the objects as separate adhesive patterns along areas of each label spaced from respective leading and trailing edges thereof; and
adhering the individual labels respectively onto the individual objects;
wherein spraying separate adhesive patterns further comprises:
spraying adhesive from a first plurality of orifices along the leading edge of each label, and
spraying adhesive from a second plurality of orifices along the trailing edge of each label.

25. The method of claim 24, wherein intermittently applying adhesive further comprises:
applying adhesive filaments in generally back and forth patterns arranged in a linear column.

26. The method of claim 24, wherein intermittently applying the adhesive further comprises cycling the adhesive applicator open and closed in less than about 9 milliseconds.

27. The method of claim 24, wherein intermittently applying the adhesive further comprises applying adhesive to at least 800 labels per minute.

28. The method of claim 24, wherein positioning the labels adjacent to the conveyor further comprises:
feeding the labels from a roll onto a vacuum wheel;
holding the labels on the vacuum wheel;
rotating the vacuum wheel adjacent to the objects; and
using the sprayed adhesive to pick the respective labels off of the vacuum wheel and adhere the labels onto the respective objects moving along the conveyor.

29. The method of claim 28, further comprising:
cutting the individual labels apart from one another while the labels are held on the vacuum wheel.

30. The method of claim 24, wherein the step of positioning the labels adjacent to the conveyor further comprises:
holding the labels in a stack; and
using the sprayed adhesive to pick the respective labels off the stack and adhere the labels onto the respective objects moving along the conveyor.

31. The method of claim 24, further comprising:
drawing residual amounts of the adhesive back into said orifices upon shut-off of the applicator.

32. The method of claim 24, wherein the step of applying adhesive further comprises:
dispensing a plurality of spaced apart beads onto the label, and
causing the spaced apart beads of adhesive to coalesce.

33. The method of claim 24, wherein the objects further comprise product packaging.

34. The method of claim 33, wherein the product packaging further comprises containers.

* * * * *